(12) United States Patent
Gass et al.

(10) Patent No.: US 7,958,806 B2
(45) Date of Patent: Jun. 14, 2011

(54) REPLACEABLE BRAKE MECHANISM FOR POWER EQUIPMENT

(75) Inventors: Stephen F. Gass, Wilsonville, OR (US); David S. D'Ascenzo, Portland, OR (US); Andrew L. Johnston, Redwood City, CA (US); Joel F. Jensen, Redwood City, CA (US); Sung H. Kim, Palo Alto, CA (US); Anwyl M. McDonald, Palo Alto, CA (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 12/590,094

(22) Filed: Nov. 2, 2009

(65) Prior Publication Data

US 2010/0132523 A1 Jun. 3, 2010

Related U.S. Application Data (63) Continuation of application No. 09/929,236, filed on Aug. 13, 2001, now Pat. No. 7,610,836.

(60) Provisional application No. 60/225,056, filed on Aug. 14, 2000, provisional application No. 60/225,057, filed on Aug. 14, 2000, provisional application No. 60/225,058, filed on Aug. 14, 2000, provisional application No. 60/225,059, filed on Aug. 14, 2000, provisional application No. 60/225,089, filed on Aug. 14, 2000, provisional application No. 60/225,094, filed on Aug. 14, 2000, provisional application No. 60/225,169, filed on Aug. 14, 2000, provisional application No. 60/225,170, filed on Aug. 14, 2000, provisional application No. 60/225,200, filed on Aug. 14, 2000, provisional application No. 60/225,201, filed on Aug. 14, 2000, provisional application No. 60/225,206, filed on Aug. 14, 2000, provisional application No. 60/225,210, filed on Aug. 14, 2000, provisional application No. 60/225,211, filed on Aug. 14, 2000, provisional application No. 60/225,212, filed on Aug. 14, 2000.

(51) Int. Cl.
*B23D 45/04* (2006.01)
*B27B 3/28* (2006.01)

(52) U.S. Cl. .......... 83/58; 83/62.1; 83/397.1; 83/471.2; 83/471.3; 83/478; 83/490; 83/581; 83/DIG. 1

(58) Field of Classification Search .......... 83/58, 62.1, 83/490, 471, 477, 471.1, 471.2, 581, DIG. 1, 83/397.1, 471.3, 478, 666, 72, 67, 473, 76.7, 83/481, 487, 485, 574, 489, 821, 823, 827; 144/356, 154, 365, 117.1, 118
See application file for complete search history.

(56) References Cited

U.S. PATENT DOCUMENTS

| | | |
|---|---|---|
| 1,960,930 A | 5/1934 | Thomas |
| 2,305,928 A * | 12/1942 | Littell ............................. 33/741 |
| 2,442,316 A * | 5/1948 | Cyrus ........................... 310/164 |
| 2,785,710 A | 3/1957 | Mowery, Jr. |
| 3,695,116 A | 10/1972 | Baur |
| 3,785,230 A | 1/1974 | Lokey |
| 4,106,378 A | 8/1978 | Kaiser |
| 4,117,752 A | 10/1978 | Yoneda |
| 4,184,783 A | 1/1980 | Hall |
| 4,453,112 A | 6/1984 | Sauer et al. |

(Continued)

*Primary Examiner* — Ghassem Alie (57) ABSTRACT

Woodworking machines are disclosed having cutting tools adapted to cut workpieces. The machines include a safety system adapted to detect one or more dangerous conditions between a person and the cutting tool, and to stop movement of the cutting tool upon detection of the dangerous condition. At least part of the safety system is housed in a removable cartridge substantially sealed against entry of sawdust.

9 Claims, 9 Drawing Sheets

U.S. PATENT DOCUMENTS

| | | | |
|---|---|---|---|
| 4,882,558 A * | 11/1989 | Takayanagi | 335/260 |
| 4,889,316 A * | 12/1989 | Donahue, Jr. | 251/129.15 |
| 5,297,463 A | 3/1994 | O'Banion et al. | |
| 5,510,884 A | 4/1996 | Bov, Jr. et al. | |
| 5,606,889 A | 3/1997 | Bielinski et al. | |
| 5,666,586 A | 9/1997 | Nishimura et al. | |
| 6,325,195 B1 | 12/2001 | Doherty | |
| 6,564,909 B1 | 5/2003 | Razzano | |
| 6,907,807 B2 | 6/2005 | Parks et al. | |
| 6,922,153 B2 | 7/2005 | Pierga et al. | |
| 7,373,863 B2 | 5/2008 | O'Banion et al. | |
| 2002/0050714 A1 | 5/2002 | Imai et al. | |
| 2004/0060404 A1 | 4/2004 | Metzger, Jr. | |
| 2004/0194594 A1 | 10/2004 | Dils et al. | |
| 2004/0200329 A1 | 10/2004 | Sako | |
| 2004/0226424 A1 | 11/2004 | O'Banion et al. | |
| 2005/0235793 A1 | 10/2005 | O'Banion et al. | |

* cited by examiner

REPLACEABLE BRAKE MECHANISM FOR POWER EQUIPMENT

CROSS-REFERENCE TO RELATED APPLICATIONS

This is a continuation of U.S. patent application Ser. No. 09/929,236 filed Aug. 13, 2001, issuing as U.S. Pat. No. 7,610,836 on Nov. 3, 2009 which claims the benefit of and priority from the following U.S. Provisional Patent Applications: Ser. No. 60/225,056, filed Aug. 14, 2000, Ser. No. 60/225,057, filed Aug. 14, 2000, Ser. No. 60/225,058, filed Aug. 14, 2000, Ser. No. 60/225,059, filed Aug. 14, 2000, Ser. No. 60/225,089, filed Aug. 14, 2000, Ser. No. 60/225,094, filed Aug. 14, 2000, Ser. No. 60/225,169, filed Aug. 14, 2000, Ser. No. 60/225,170, filed Aug. 14, 2000, Ser. No. 60/225,200, filed Aug. 14, 2000, Ser. No. 60/225,201, filed Aug. 14, 2000, Ser. No. 60/225,206, filed Aug. 14, 2000, Ser. No. 60/225,210, filed Aug. 14, 2000, Ser. No. 60/225,211, filed Aug. 14, 2000, and Ser. No. 60/225,212, filed Aug. 14, 2000. All of the above applications are hereby incorporated by reference.

FIELD

The present invention relates to safety systems for power equipment, and more particularly to a replaceable brake mechanism for use in woodworking equipment and other power equipment.

BACKGROUND

Safety systems are often employed with power equipment such as table saws, miter saws, band saws, jointers, shapers, circular saws and other woodworking machinery, to minimize the risk of injury when using the equipment. Probably the most common safety feature is a guard that physically blocks an operator from making contact with dangerous components of machinery, such as belts, shafts or blades. In many cases, guards effectively reduce the risk of injury, however, there are many instances where the nature of the operations to be performed precludes using a guard that completely blocks access to hazardous machine parts.

The present invention discloses safety systems for use on power equipment. The disclosed safety systems include a replaceable brake mechanism adapted to engage a blade or other cutting tool to protect the user against serious injury if a dangerous, or triggering, condition occurs. The brake mechanism includes a one or more cartridges that may be selectively removed and replaced from the power equipment, such as after use and/or to adapt the brake mechanism for a particular use.

DETAILED DESCRIPTION

Figure 1:
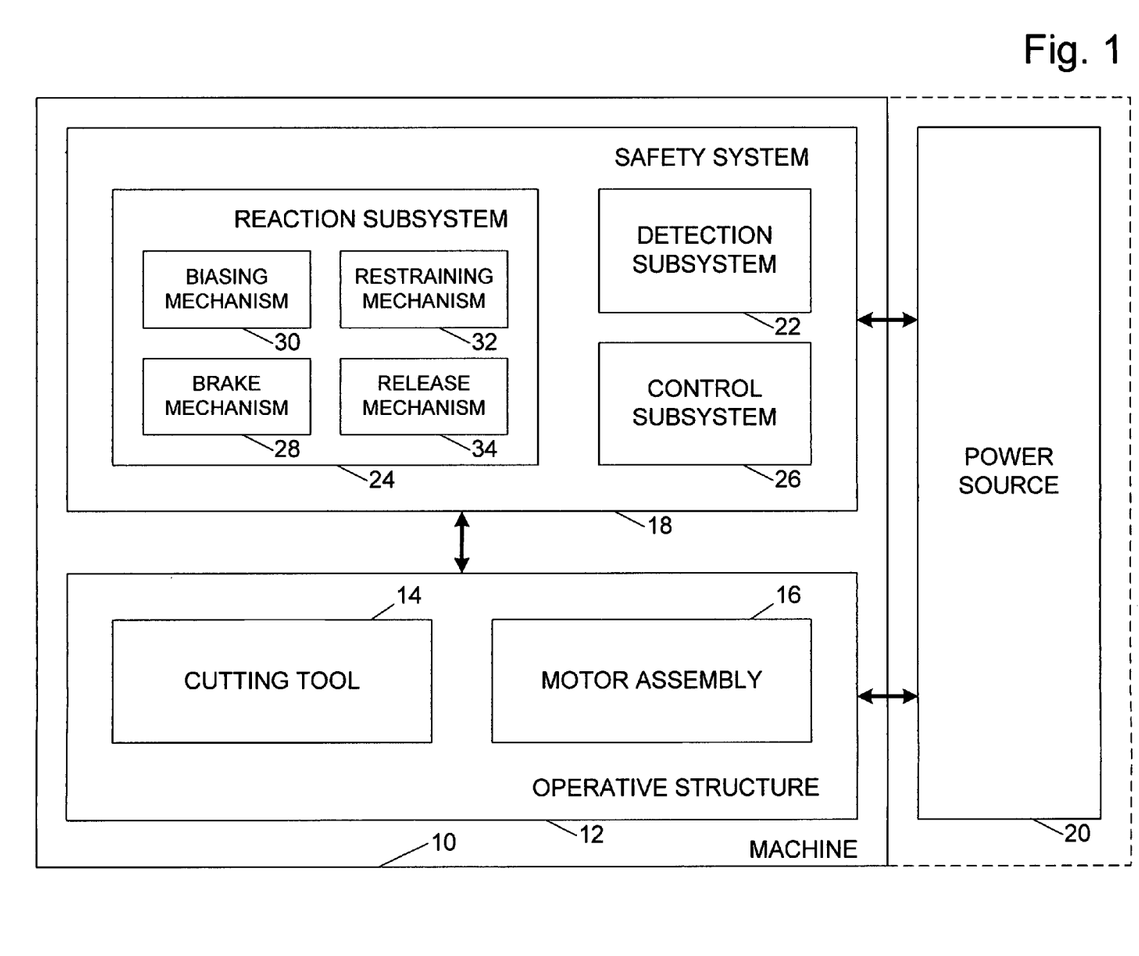
FIG. 1 is a schematic block diagram of a machine with a fast-acting safety system according to the present invention.

A machine is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous, or triggering, conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, entitled "Cutting Tool Safety System," filed Aug. 14, 2000 by SD3, LLC, the disclosure of which is herein incorporated by reference. Retraction of the cutting tool from its operating position is described in more detail in U.S. Provisional Patent Application Ser. No. 60/225,089, entitled "Retraction System For Use In Power Equipment," filed Aug. 14, 2000 by SD3, LLC, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
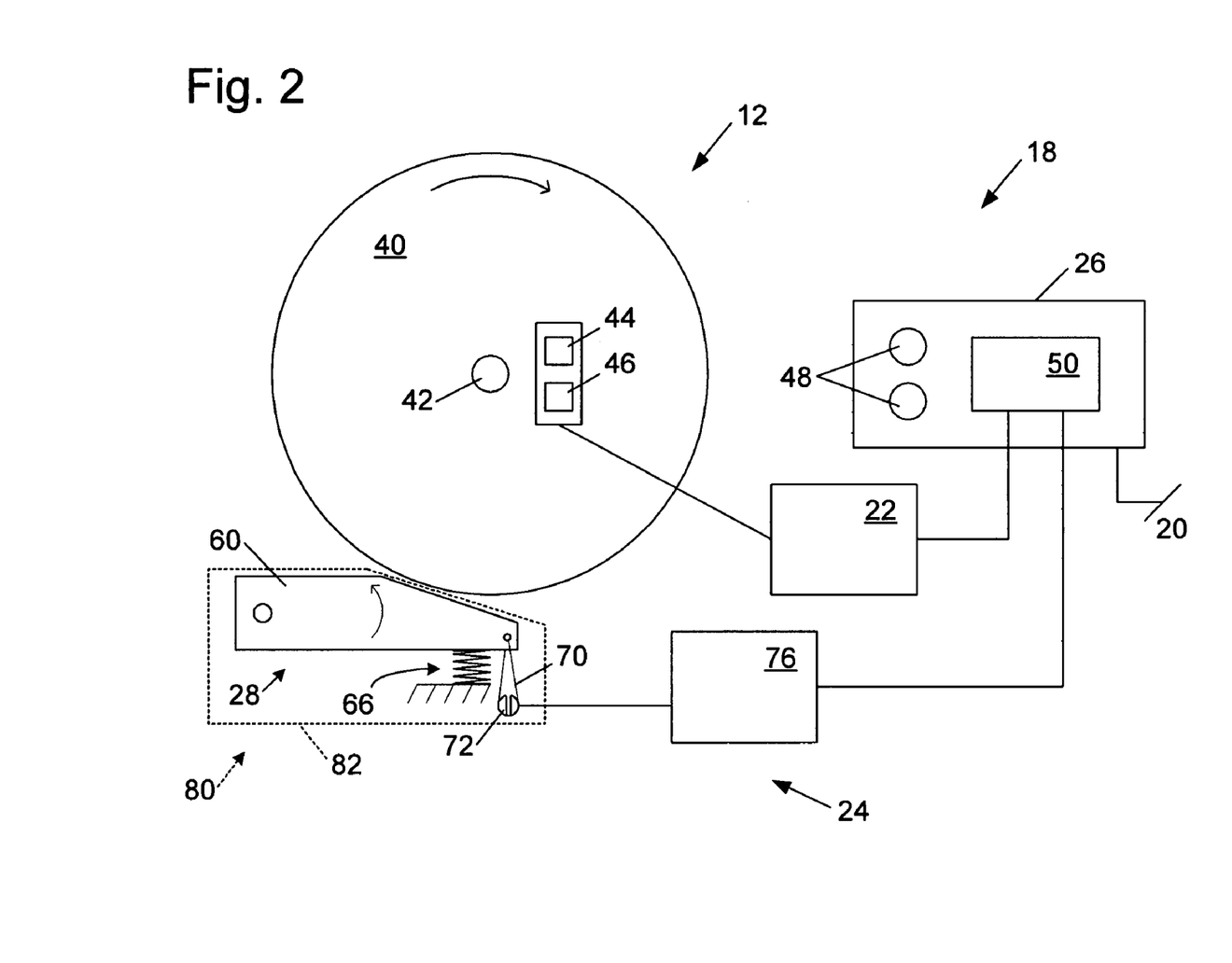
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, entitled "Translation Stop For Use In Power Equipment," filed Aug. 14, 2000 by SD3, LLC, the disclosure of which is herein incorporated by reference, describes other systems for stopping the movement of the cutting tool. U.S. Provisional Patent Application Ser. No. 60/225,058, entitled "Table Saw With Improved Safety System," filed Aug. 14, 2000 by SD3, LLC and U.S. Provisional Patent Application Ser. No. 60/225,057, entitled "Miter Saw With Improved Safety System," filed Aug. 14, 2000 by SD3, LLC, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, entitled "Contact Detection System For Power Equipment," filed Aug. 14, 2000 by SD3, LLC and U.S. Provisional Patent Application Ser. No. 60/225,211, entitled "Apparatus And Method For Detecting Dangerous Conditions In Power Equipment," filed Aug. 14, 2000 by SD3, LLC, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, entitled "Logic Control For Fast Acting Safety System," filed Aug. 14, 2000 by SD3, LLC and U.S. Provisional Patent Application Ser. No. 60/225,094, entitled "Motion Detecting System For Use In Safety System For Power Equipment," filed Aug. 14, 2000 by SD3, LLC, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately 1/32-inch to 1/4-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, entitled "Firing Subsystem For Use In Fast Acting Safety System," filed Aug. 14, 2000 by SD3, LLC, U.S. Provisional Patent Application Ser. No. 60/225,170, entitled "Spring-Biased Brake Mechanism for Power Equipment," filed Aug. 14, 2000 by SD3, LLC, and U.S. Provisional Patent Application Ser. No. 60/225,169, entitled "Brake Mechanism For Power Equipment," filed Aug. 14, 2000 by SD3, LLC, the disclosures of which are herein incorporated by reference.

It will be appreciated that activation of the brake mechanism will typically require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Housing 82 may be formed of any suitable material or combination of materials, such as plastic, fiber-reinforced plastic, metal, etc. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80.

In FIG. 2 and the subsequent figures, various embodiments of cartridges 80 are shown and described and include various elements, subelements and possible variations. It should be understood that cartridges according to the present invention may include any one or more of these elements, subelements and variations, regardless of whether those elements, subelements and variations are shown in the same or different figures or descriptions.

Examples of suitable brake mechanisms 28 and biasing mechanisms 30, including suitable pawls 60 that may be used with the cartridges described herein are disclosed in U.S. Provisional Patent Application Ser. No. 60/225,169, entitled "Brake Mechanism For Power Equipment," filed Aug. 14, 2000 by SD3, LLC and U.S. Provisional Patent Application Ser. No. 60/225,170, entitled "Spring-Biased Brake Mechanism for Power Equipment," filed Aug. 14, 2000 by SD3, LLC. The disclosures of these provisional applications are hereby incorporated by reference.

Cartridge 80 should include or be in communication with the operative portions of release mechanism 34 that are required to cause restraining mechanism 32 to release pawl 60 to engage the blade or other cutting tool of the machine. For example, in FIG. 2, it can be seen the mounts 72 are in electrical communication with firing subsystem 76. Upon activation of detection subsystem 22, such as upon detection of a dangerous or triggering condition, firing subsystem 76 actuates release mechanism 32, such as by melting fusible member 70 with a surge of current stored by subsystem 76. Examples of suitable restraining mechanisms 32 and firing subsystems 76 for use in cartridges 80 are disclosed in U.S. Provisional Patent Application Ser. No. 60/225,056, entitled "Firing Subsystem for Use in a Fast-Acting Safety System," filed Aug. 14, 2000 by SD3, LLC, the disclosure of which is herein incorporated by reference. The communication between the firing subsystem and mounts 72 may be by any suitable electrical linkage. Preferably, the electrical connection between mounts 72 and subsystem 76 is automatically established when cartridge 80 is installed within machine 10. For example, housing 82 may include contacts that engage corresponding contacts associated with the firing subsystem when the cartridge is installed in its mounting position within the machine. Alternatively, a plug and socket assembly may be used to electrically interconnect the mounts 72 and firing subsystem 76.

Cartridge 80 is removably installed in machine 10 so that brake mechanism 28, and more particularly pawl 60, is positioned near the blade or other cutting tool of the machine. Cartridge 80 may include a brake positioning system or other suitable mechanism for selectively adjusting the position of the pawl and/or cartridge relative to blade 40. For example, the position of the cartridge relative to the blade or other cutting tool may be adjustable such as by pivoting or sliding the cartridge relative to one or more mounting bolts. In which case, pawl-to-blade spacing may be determined indirectly by measuring the blade-to-cartridge spacing if desired. Alternatively, the cartridge may be stationary and the pawl may be adjustable within the cartridge. As a further alternative, both the cartridge and pawl are adjustable. Examples of suitable brake positioning system are disclosed in U.S. Provisional Patent Application Ser. No. 60/225,212, entitled "Brake Positioning System," filed Aug. 14, 2000 by SD3, LLC, the disclosure of which is herein incorporated by reference.

Figures 3, 10:
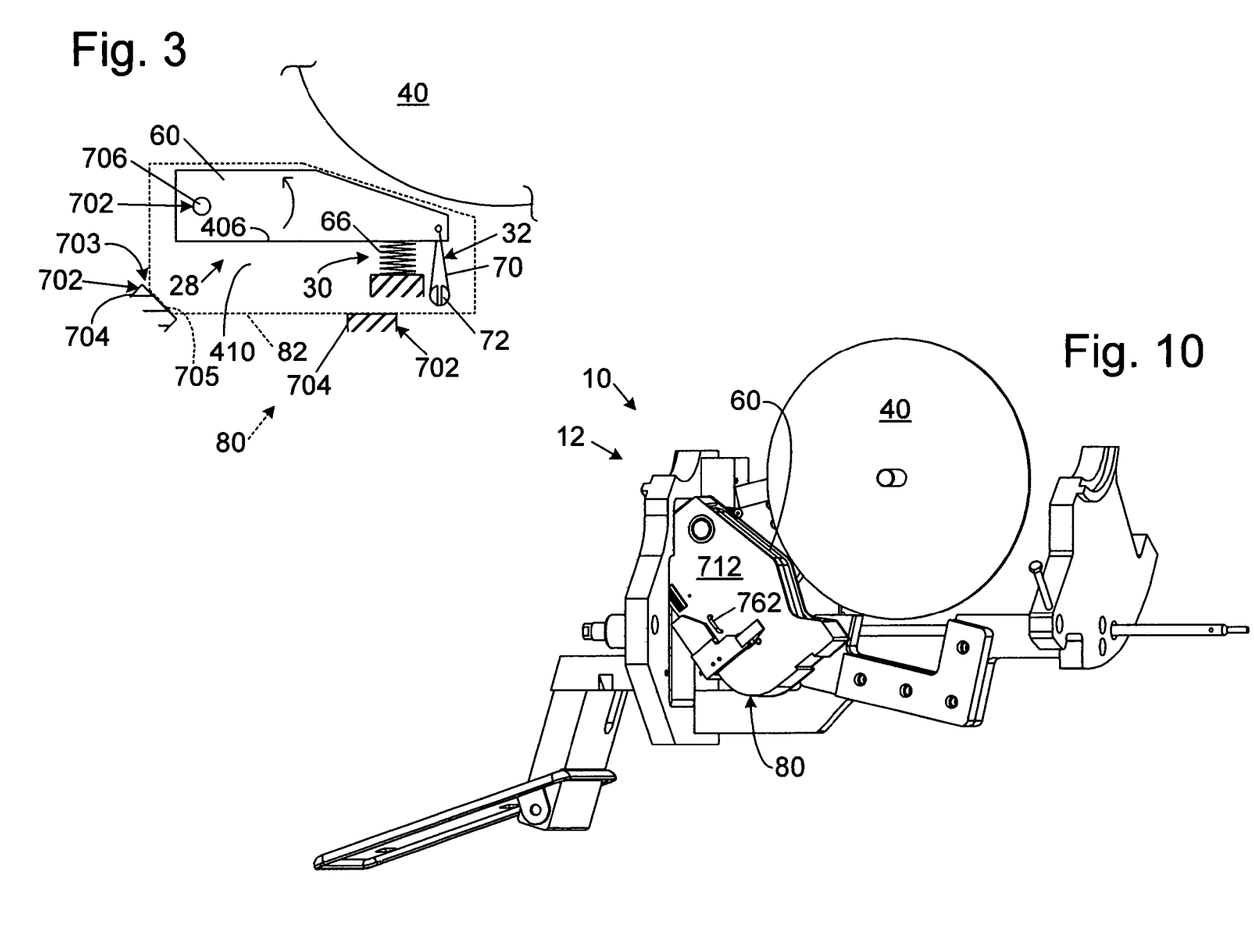
FIG. 3 is a fragmentary side elevation view of a safety system having a replaceable brake mechanism housed in a cartridge.
FIG. 10 is an isometric view showing the cartridge of FIG. 9 installed in a machine.

As shown in FIG. 3, machine 10 includes a support structure 702 adapted to receive cartridge 80 and operatively position the cartridge for use in safety system 18. Support structure 702 may extend from or be mounted on any suitable structure forming part of machine 10. When the position of blade 40 is adjustable, it may be preferable for cartridge 80 and/or support structure 702 to move with the blade so that the desired positioning of pawl 60 relative to blade 40 is maintained. Alternatively the cartridge may include a pawl 60 sized to accommodate adjustments to the position of the blade without requiring corresponding adjustments to the cartridge and/or mounting structure.

Examples of suitable support structures include one or more mounting brackets 704 to which the cartridge is attached by any suitable releasable fastening mechanism, such as bolts, pins or screws. Support structure 702 may additionally, or alternatively, include one or more axles 706 upon which the cartridge is mounted. For example, pawl 60 is shown in FIG. 3 pivotally mounted on an axle 706 that passes through pawl 60 and at least a portion of cartridge 80. Also shown in FIG. 3, is mounting bracket 704 that supports and positions cartridge 80 relative to blade 40. Another example of a suitable support structure is a socket or other receiver within machine 10. Typically, cartridge 80 will be supported in sufficient directions and/or positions to retain the cartridge in its intended mounting position and orientation. Cartridge 80 and support structure 702 preferably include key structure 703 that prevents the cartridge from being installed within machine 10 other than in its intended mounting position. An example of a suitable key structure 703 is shown in FIG. 3, in which housing 82 of cartridge 80 includes a bevel 705 that mates with mounting bracket 704. It should be understood that key structure 703 may include any suitable mechanism, including the relative size, shape and positioning of cartridge 80 and support structure 702, that prevents the cartridge from being installed in a position other than its intended mounting position.

Figure 4:
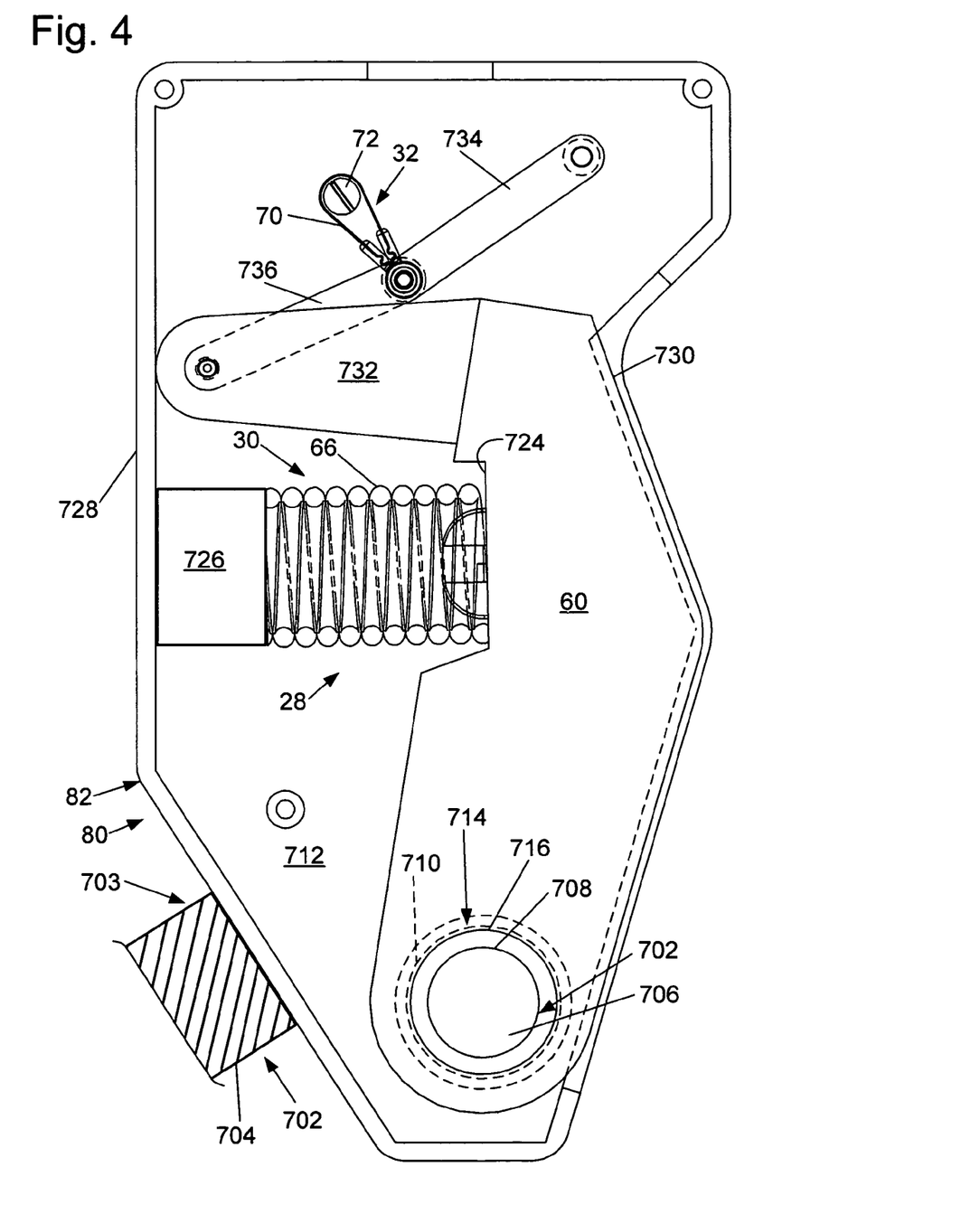
FIG. 4 is a side elevation view of the interior of another cartridge according to the present invention.

Another cartridge according to the present invention is shown in FIG. 4. Similar to the cartridge shown in FIGS. 2 and 3, the cartridge shown in FIG. 4 includes a housing 82, a brake mechanism 28 having a pawl 60, a biasing mechanism 30 such as spring 66, and a restraining mechanism 32 such as fusible member 70. Also shown is another example of a suitable key structure 703, namely, the irregular shape of housing 82 and mounting bracket 704 against which the housing is supported.

As shown, pawl 60 includes an aperture, or bore, 708 through which an axle or pin 706 may extend to support the pawl and cartridge within machine 10. Also shown is an aperture 710 in one or more of the cartridge's side walls 712 through which axle 706 extends. Alternatively, cartridge 80 may be supported by a support structure 702 that does not directly support pawl 60. For example, pawl 60 may pivot about an axle forming part of cartridge 80, which in turn is supported by support structure 702, such as pins, mounting brackets or the like. However, it may be preferable to support pawl 60 with at least one of support structures 702 to increase the supporting force provided other than by cartridge 80. Similarly, this reduces the strength required for cartridge 80 because support structures 702 absorb much of the force imparted on pawl 60 as the pawl engages the blade or other cutting tool of the machine.

Figure 5:
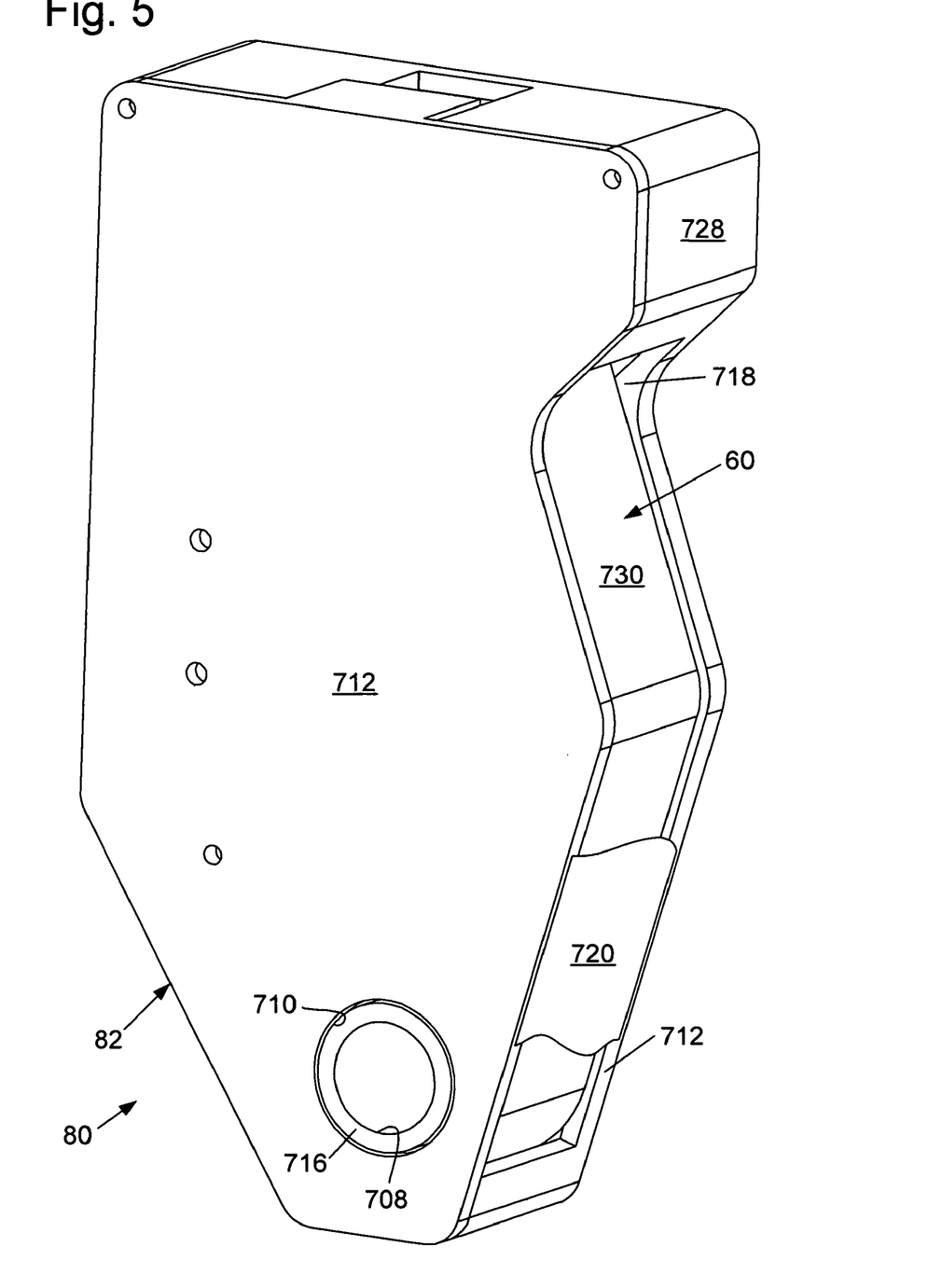
FIG. 5 is an isometric view of the cartridge of FIG. 4.

Pawl 60 should be retained in its mounting position within cartridge 80 when the cartridge is not installed within the machine. An example of a suitable coupling 714 between the pawl and cartridge is shown in FIG. 5, in which the aperture 710 through cartridge 80 is larger than the corresponding aperture 708 through pawl 60. Pawl 60 includes an outwardly extending bushing, or carrier, 716 that extends at least partially through the sidewalls of the cartridge to position the pawl relative to the cartridge. It should be understood that it is within the scope of the invention that this configuration could be reversed, with pawl 60 having a larger aperture than cartridge 80 and with the cartridge having an inwardly extending bushing or carrier that passes at least partially through the aperture in pawl 60.

Also shown in more detail in FIG. 5 is the cartridge's opening 718 through which at least a portion of pawl 60 projects upon release of restraining mechanism 32. Although pawl 60 is shown completely within housing 82 in FIG. 5, it should be understood that at least a portion of pawl 60 may project from housing 82 when the pawl is in its cocked, or restrained, position. Opening 718 may include a cover 720 that seals the opening and thereby prevents contaminants such as dust, particulate, water, grease and the like from entering the cartridge and possibly interfering with the operation thereof. Although only a portion of cover 720 is shown in FIG. 5, it should be understood that the cover preferably covers the entire opening 718. Cover 720 may be formed of any suitable material to prevent contaminants from entering the cartridge through opening 718, while not interfering with the operation of brake mechanism 28. Examples of suitable materials for cover 720 include tape and thin metal, paper or plastic films. When a cover 720 is used that completely closes opening 718, the entire cartridge is preferably, but not necessarily, sealed against the entry of contaminants. Cover 720 may be attached to cartridge 80 through any suitable mechanism, such as with an adhesive. In embodiments of the cartridge in which the pawl is not prevented from pivoting or otherwise moving by restraining mechanism 32, cover 720 may also function as a pawl-restraining mechanism that prevents the pawl from extending through opening 718 until release of biasing mechanism 30 by the restraining mechanism.

Returning briefly to FIG. 4, it can be seen that biasing mechanism 30 includes spring 66, which is compressed between a spring-receiving portion 724 of the pawl and a support 726 forming part of cartridge 80. As shown, support 726 extends from the housing of the cartridge, although any suitable support may be used, including the end wall 728 of the cartridge, a support that extends from the end wall, and a support that extends from at least one of the cartridge's side walls 712.

In the embodiment of pawl 60 shown in FIG. 4, the pawl includes a blade-engaging surface 730 and a distal portion 732 that is coupled to linkages 734 and 736. Linkage 734 is pivotally coupled to housing 82, and linkage 736 interconnects distal portion 732 of pawl 60 to linkage 734. As shown, both linkages are in compression when pawl 60 is in its cocked, or restrained, position. It should be understood, however, that any suitable number and type of linkages may be used. Alternatively, restraining mechanism 32 may restrain the pawl directly, such as shown in FIGS. 2 and 3. As a further alternative, restraining mechanism 32 may restrain a support positioned intermediate spring 66 and pawl 60 and upon which restraining mechanism 32 acts, thereby leaving pawl completely or relatively free from the bias of spring 66 until the release of restraining mechanism 32.

Figure 6:
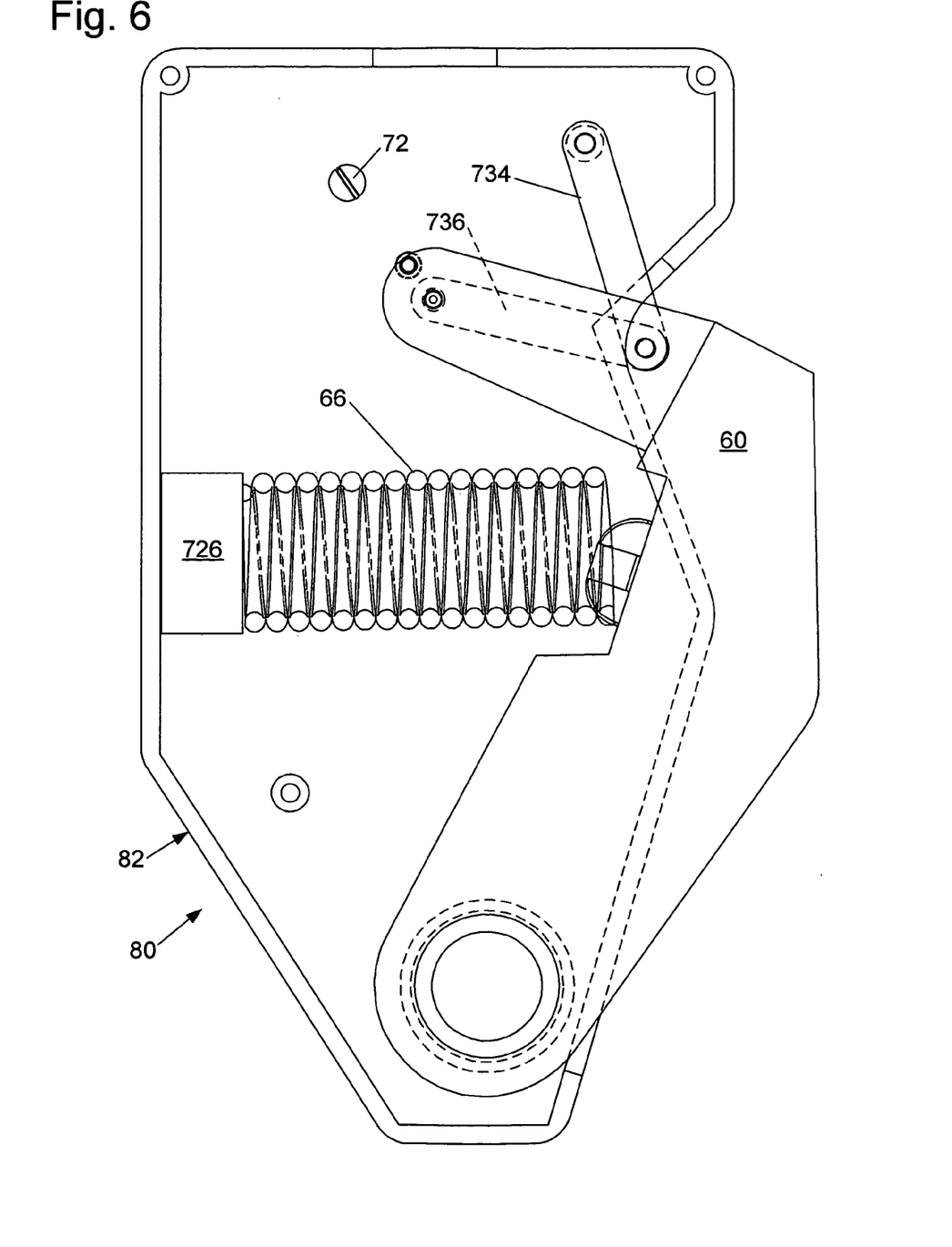
FIG. 6 is a side elevation view of the cartridge of FIG. 4 with the pawl in its blade-engaging position.

Fusible member 70 extends around contact mount 72 and at least a portion of one of the linkages to prevent pawl 60 from pivoting under the force of biasing mechanism 30. As shown, the ends of fusible member 70 are coupled to the linkages. Upon release of restraining mechanism 32, such as when a sufficient current is passed through fusible member 70 via contact mount 72, the fusible member no longer retains the linkages and pawl in the position shown, and the pawl pivots to its blade-engaging position, which is shown in FIG. 6.

Figure 7:
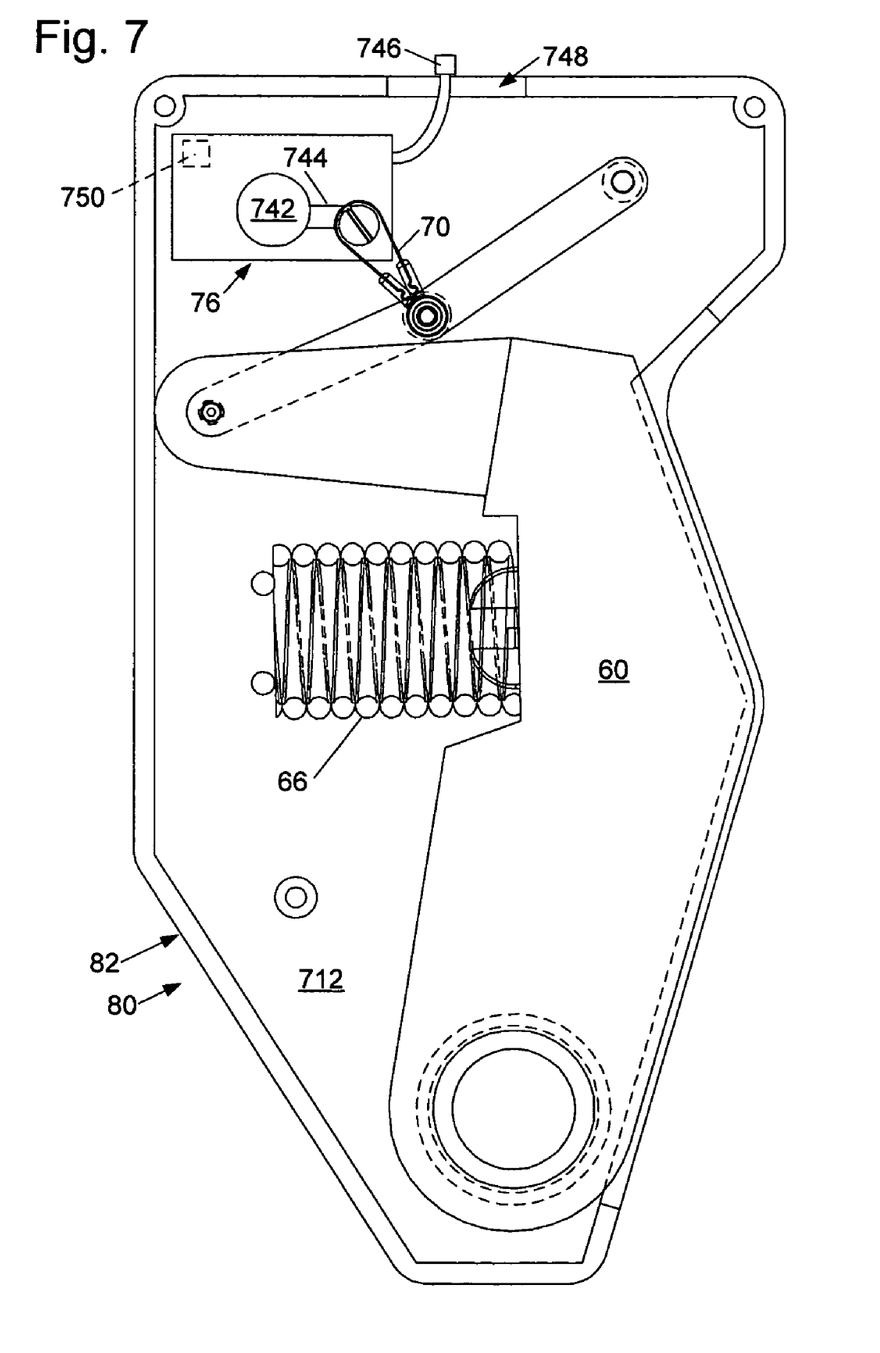
FIG. 7 is a side-elevation view of another cartridge according to the present invention.

Firing subsystem 76 may alternatively be located within housing 80, such as schematically illustrated in FIG. 7. An advantage of locating firing subsystem 76 within cartridge 80 is that the firing subsystem may be replaced with the rest of the cartridge. It also enables the capacitor or other current-storing or current-generating device 742 used to release fusible member 70 to be housed near contact mounts 72 and connected thereto by a direct linkage 744, instead of by wires. Also shown in FIG. 7 is plug 746 that extends through a port 748 in housing 82 and which is adapted to electrically connect firing subsystem 76 with controller 50 or another suitable portion of control subsystem 26. Alternatively, contacts 750 are shown extending from or forming a portion of housing 82.

Figure 8:
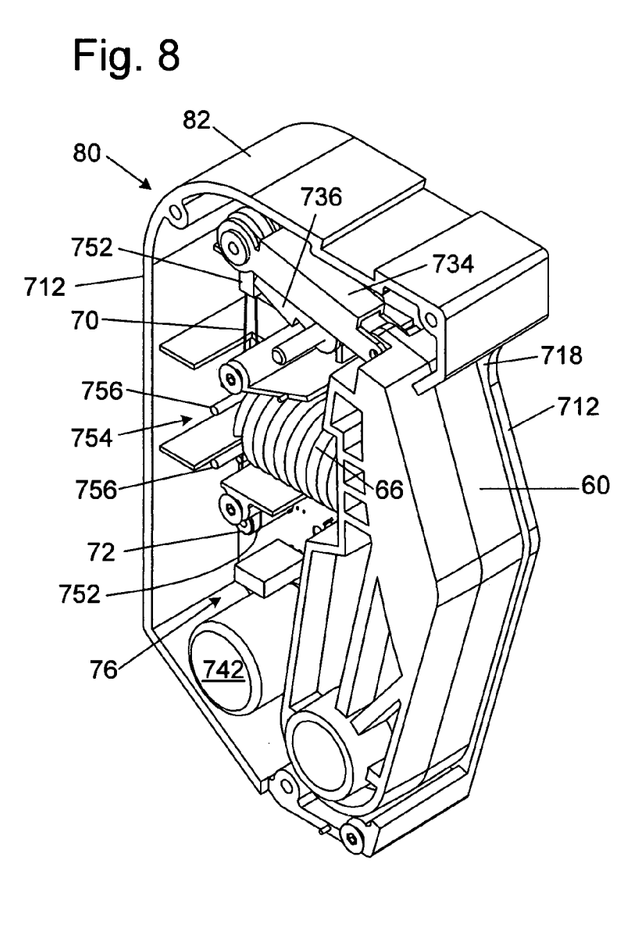
FIG. 8 is an isometric view of the interior of another cartridge according to the present invention.

Another exemplary cartridge is shown in FIG. 8. As shown, cartridge 80 includes firing subsystem 76 of release mechanism 34. Also shown in FIG. 8 is another version of linkages 734 and 736, in which linkage 734 is in tension instead of compression. The linkage assemblies shown in FIGS. 4 and 8 may both be referred to as over-center linkages. In FIG. 8, fusible member 70 is shown having a fixed length defined by end portions 752 that are adapted to be coupled to contact mount 72 and linkages 734 and 736, respectively. An advantage of a fixed length fusible member is that it facilitates easier assembly of cartridges with uniform pawl positions.

Figure 9:
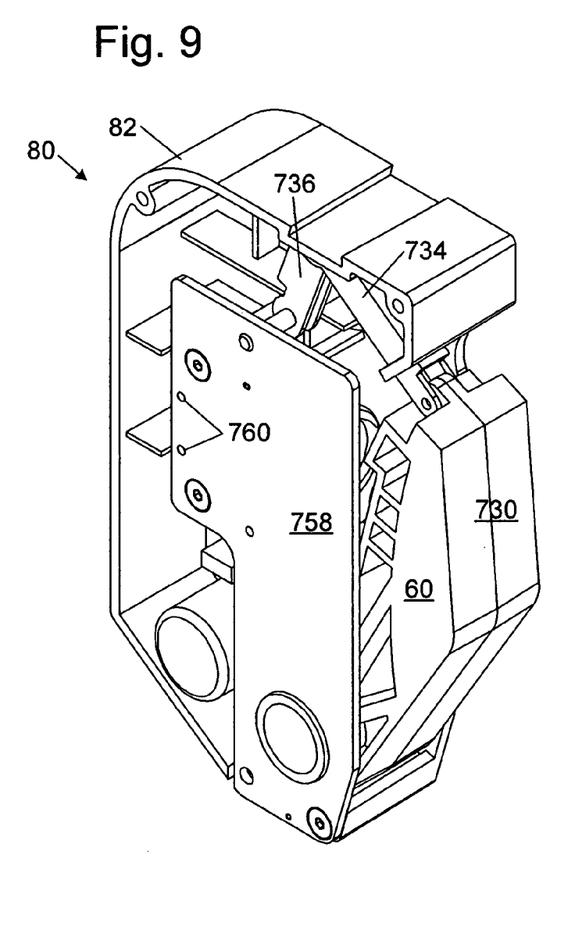
FIG. 9 is an isometric view of a variation of the cartridge of FIG. 8.

Unlike support 726, which is shown in FIG. 4 supporting the end of spring 66 distal pawl 60, in FIG. 8, cartridge 80 includes a removable support 754. Support 754 may be selectively removed from cartridge 80 to release, or at least substantially reduce, the biasing force exerted by spring 66 upon pawl 60. For example, support 754 may be removed after actuation of brake mechanism 28 to remove the spring force so that it is easier to remove and replace the cartridge. An example of a suitable support 754 is a clip 756 that extends through at least one of the cartridge's side walls 712. Clip 756 may be supported between both of the cartridges side walls. Alternatively, cartridge 80 may include an internal support 758 adapted to support the ends 760 of clip 756, such as shown in FIG. 9, in which the pawl is shown in its blade-engaging positions. Preferably clip 756 or other support 754 may be removed from the cartridge without having to first remove the cartridge from machine 10. For example, clip 756 may include a portion 762 that extends external to cartridge 80 and which may be grasped by a tool to withdraw the clip from the cartridge, such as shown in FIG. 10. A benefit of the embodiment shown in FIG. 9 is that pulling clip 756 releases spring 66, which in turn breaks fusible member 70. The safety system's controller may be configured to detect this break in fusible member 70, and respond accordingly to the fault in the system.

In FIGS. 7-9, firing subsystem 76 is shown housed within cartridge 80. It should be understood that other components of the safety system's electronics may also be housed within cartridge 80. For example, the cartridge may include a sensing assembly to determine if the cartridge is properly installed within machine 10, with operation of the machine being prevented until the safety system receives a signal that the cartridge is properly installed.

Figure 11:
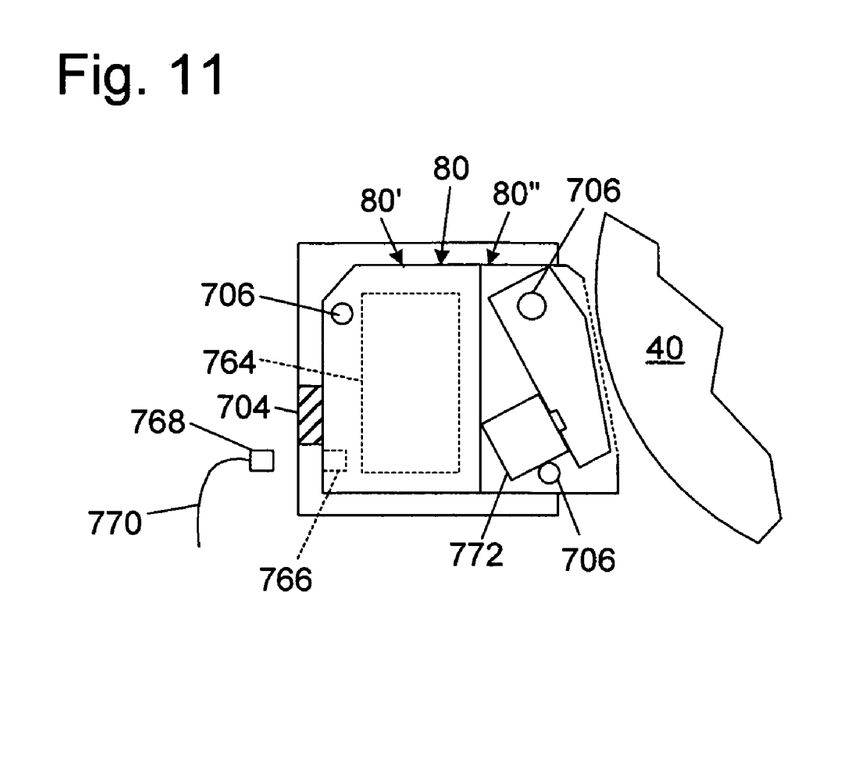
FIG. 11 is a fragmentary side elevation view of another cartridge according to the present invention.

Placing most of safety system 18 in the cartridge allows manufacturers to develop improved electronics, additional functions, etc., without requiring significant, if any, changes to the machine. As a further alternative, safety system 18 may include a plurality of cartridges, including at least one cartridge that contains pawl 60 and at least one cartridge that contains electronics, such as firing subsystem 76 and/or other electronic portions of the safety system. An example of such a cartridge assembly is shown in FIG. 11. As shown, a pair of cartridges 80 are shown and indicated generally at 80' and 80". Cartridges 80' and 80" may also be described as subcartridges or modules that are united to form cartridge 80. Cartridge 80' includes an electronics unit 764, such as firing subsystem 76 or control subsystem 26, and an electrical connector 766 configured to operably engage plug 768, attached to cable 770. The cable includes conductors for supplying electrical power to the electronics unit. The cable may also conduct output signals from the electronics unit, such as a cutoff signal to stop motor assembly 16, or a signal to control subsystem 26, depending upon the particular electronics housed in cartridge 80'. Although plug 768 and cable 770 are shown as being freely movable, it will be appreciated that plug 768 may be rigidly mounted to the support surface upon which cartridge 80 is mounted. Further, plug 768 may be rigidly positioned to ensure that the cartridge is properly aligned and oriented when the connector is engaged with the plug. Cartridge 80", on the other hand, includes pawl 60 and the biasing and restraining mechanisms, which are collectively indicated as module 772 to indicate that the biasing and restraining mechanisms may also form a cartridge or module that may be selectively removed and replaced. Preferably, the cartridges are in communication with each other, such as to release the restraining mechanism responsive to a signal from electronics unit 764.

Figure 12:
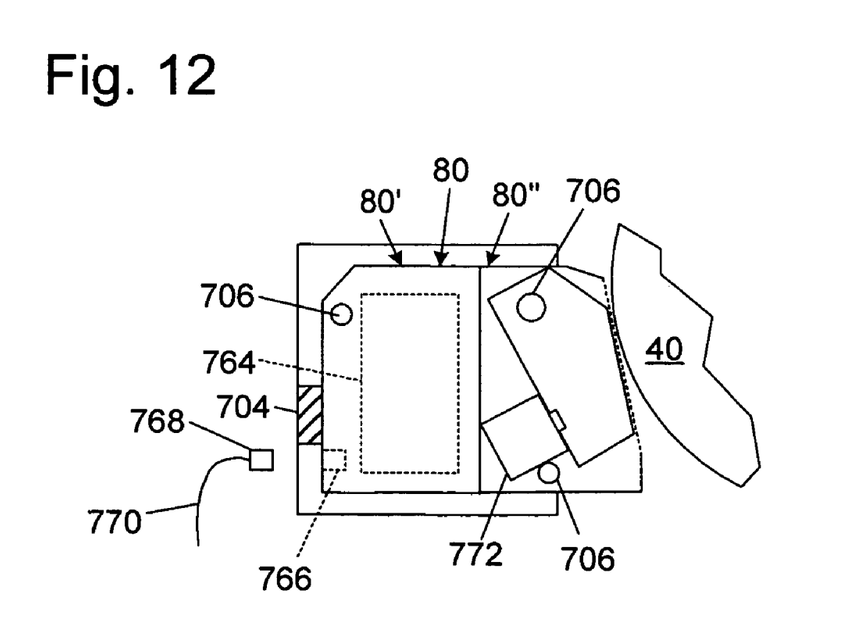
FIG. 12 is a fragmentary side elevation view of another cartridge according to the present invention.

Optionally, cartridge 80", or any of the previously described cartridges, may be provided in different sizes or configurations to accommodate different blade sizes. For example, a longer version of the cartridge, such as shown in FIG. 12, may be used for a smaller diameter blade 40. Furthermore, different cartridges may be provided for different applications that use different types of blades (e.g., dado, cross-cutting, ripping, plywood, etc.). For example, a first cartridge having a first type pawl may be provided for a first type blade, while a second cartridge having a second, different pawl may be provided for a second, different blade. Alternatively, the electronics of one cartridge may be different from those of another cartridge to allow for different applications (e.g., cutting plastic rather than wood). Additionally, plural cartridges may be used simultaneously to ensure the safety system responds optimally for each material.

While one particular implementation of safety system 18 has been described, it will be appreciated that many variations and modifications are possible within the scope of the invention. Many such variations and modifications are described in U.S. Provisional Patent Application Ser. Nos. 60/182,866 and 60/157,340, the disclosures of which are herein incorporated by reference. For example, while portions of safety system 18 have been described herein as being incorporated into a replaceable cartridge 80, other components of the safety system may also be included in the cartridge.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A woodworking machine comprising:
   a cutting tool adapted to cut a workpiece;
   a motor adapted to drive the cutting tool;
   a detection system adapted to detect a dangerous condition between a person and the cutting tool; and
   a reaction system adapted to mitigate the dangerous condition upon detection of the dangerous condition, where at least part of the reaction system is housed in a cartridge, where the cartridge is designed to be installed and removed from the machine by hand without the use of tools, and where the cartridge is at least substantially sealed against entry of sawdust.

2. The machine of claim 1, where the cartridge includes at least one opening sealed by a plastic film.

3. The machine of claim 1, where the cartridge includes at least one opening sealed by a metal film.

4. The machine of claim 1, where the reaction system includes at least one brake pawl mounted in the cartridge, and where the brake pawl is selectively movable into contact with the cutting tool upon detection of the dangerous condition.

5. The machine of claim 1, where the reaction system includes at least one brake pawl and an actuator configured to move the brake pawl into contact with the cutting tool, and where the actuator is mounted in the cartridge.

6. The machine of claim 1, where the reaction system is a brake system adapted to decelerate the cutting tool upon detection of the dangerous condition, and where at least part of the brake system is housed in the cartridge.

7. The woodworking machine of claim 1, where the reaction system includes electronics housed in the cartridge.

8. The machine of claim 1, where the reaction system is a brake system adapted to decelerate the cutting tool upon detection of the dangerous condition, and where at least part of the brake system is housed in the cartridge.

9. A woodworking machine comprising:
   a cutting tool adapted to cut a workpiece;
   a motor adapted to drive the cutting tool;
   a detection system adapted to detect a dangerous condition between a person and the cutting tool;
   a reaction system adapted to mitigate the dangerous condition, where at least part of the reaction system is housed in a cartridge and where the cartridge is designed to be installed and removed from the machine by hand without the use of tools; and
   means for substantially sealing the cartridge against entry of sawdust.

* * * * *